(12) United States Patent
Bousquet et al.

(10) Patent No.: US 10,109,207 B2
(45) Date of Patent: Oct. 23, 2018

(54) METHOD AND DEVICE FOR AN AIRCRAFT FOR HANDLING POTENTIAL COLLISIONS IN AIR TRAFFIC

(71) Applicant: AIRBUS DEFENCE AND SPACE GMBH, Ottobrunn (DE)

(72) Inventors: Joy Jonatan Bousquet, Gaimersheim (DE); Winfried Lohmiller, Freising (DE); Joerg Meyer, Mainburg (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 41 days.

(21) Appl. No.: 15/084,917

(22) Filed: Mar. 30, 2016

(65) Prior Publication Data
US 2016/0293022 A1    Oct. 6, 2016

(30) Foreign Application Priority Data

Apr. 1, 2015    (EP) .................................... 15000943

(51) Int. Cl.
*G08G 5/04* (2006.01)
*G01S 13/02* (2006.01)
*G01S 13/95* (2006.01)
*G01S 17/08* (2006.01)
*G05D 1/00* (2006.01)

(52) U.S. Cl.
CPC .............. *G08G 5/045* (2013.01); *G01S 13/02* (2013.01); *G01S 13/953* (2013.01); *G01S 17/08* (2013.01); *G05D 1/0011* (2013.01)

(58) Field of Classification Search
None
See application file for complete search history.

(56) References Cited

U.S. PATENT DOCUMENTS

| | | | |
|---|---|---|---|
| 5,892,462 A * | 4/1999 | Tran | G01C 5/005 340/961 |
| 6,604,044 B1 * | 8/2003 | Kirk | G08G 5/0043 701/1 |
| 7,961,135 B2 | 6/2011 | Smith et al. | |
| 8,380,367 B2 | 2/2013 | Schultz et al. | |
| 8,731,812 B2 | 5/2014 | Bushnell | |

(Continued)

FOREIGN PATENT DOCUMENTS

EP    1 798 572 A    6/2007

OTHER PUBLICATIONS

Extended European Search Report for Application No. EP 15 00 0943 dated Oct. 14, 2015.

*Primary Examiner* — Krishnan Ramesh
(74) *Attorney, Agent, or Firm* — Jenkins, Wilson, Taylor & Hunt, P.A.

(57) ABSTRACT

A method for an aircraft for handling potential collisions in air traffic includes providing by a collision avoidance system a collision avoidance maneuver to avoid a collision with one or more intruders. The collision avoidance system is configured to obtain information about these intruders. The method includes further providing flight management constraints from an onboard flight system. Further, the method includes providing flight situation data from a navigation system. The method includes generating a modified collision avoidance maneuver based on the collision avoidance maneuver provided by the collision avoidance system, the flight situation data and the flight management constraints.

15 Claims, 4 Drawing Sheets

(56) References Cited

U.S. PATENT DOCUMENTS

| | | | |
|---|---|---|---|
| 8,868,328 B1* | 10/2014 | Estkowski | G08G 5/045 |
| | | | 701/301 |
| 8,892,348 B2 | 11/2014 | Chamlou | |
| 2005/0273223 A1* | 12/2005 | Artini | G05D 1/0646 |
| | | | 701/9 |
| 2006/0052912 A1* | 3/2006 | Meunier | G08G 5/045 |
| | | | 701/10 |
| 2007/0078600 A1* | 4/2007 | Fregene | G01S 13/9303 |
| | | | 701/301 |
| 2008/0021647 A1* | 1/2008 | Daveze | G08G 5/045 |
| | | | 701/301 |
| 2010/0039310 A1 | 2/2010 | Smith et al. | |
| 2010/0076626 A1* | 3/2010 | Botargues | G08G 5/045 |
| | | | 701/5 |
| 2010/0076686 A1* | 3/2010 | Botargues | G08G 5/04 |
| | | | 701/301 |
| 2010/0121503 A1* | 5/2010 | Sundqvist | G05D 1/0287 |
| | | | 701/11 |
| 2010/0274486 A1* | 10/2010 | Lorido | G08G 5/0086 |
| | | | 701/301 |
| 2010/0292871 A1 | 11/2010 | Schultz et al. | |
| 2012/0191332 A1* | 7/2012 | Sawhill | G08G 5/0013 |
| | | | 701/120 |
| 2012/0203450 A1* | 8/2012 | Meyer | B64C 39/02 |
| | | | 701/301 |
| 2013/0106645 A1* | 5/2013 | Goodson | G01S 13/9303 |
| | | | 342/29 |
| 2013/0321176 A1* | 12/2013 | Vasek | G08G 5/04 |
| | | | 340/945 |
| 2014/0019034 A1 | 1/2014 | Bushnell | |
| 2015/0284010 A1* | 10/2015 | Beardsley | B60W 50/10 |
| | | | 701/41 |

\* cited by examiner

METHOD AND DEVICE FOR AN AIRCRAFT FOR HANDLING POTENTIAL COLLISIONS IN AIR TRAFFIC

CROSS-REFERENCE TO RELATED APPLICATION

This application claims priority to EP 15 000 943.9 filed Apr. 1, 2015, the entire disclosure of which is incorporated by reference herein.

TECHNICAL FIELD

The disclosure herein relates to a method for an aircraft for handling potential collisions in air traffic.

BACKGROUND

EP 1 798 572 A discloses a traffic alert and collision avoidance system (TCAS) system on a host aircraft that includes a processor, a transmitter, and a receiver. The transmitter generates an interrogation signal based upon surveillance alerts, such as approaching aircraft and threat potentials, produced by surveillance radar. The surveillance radar transmits TCAS transmitter interrogation signals and receives replies at a receiving device. A target aircraft includes a surveillance system that receives the interrogation signal at a transmitter receiving device and, when interrogated, generates a standard transponder reply signal via a transmitter.

The second generation of the TCAS system (the so-called TCAS II system), which is used in the majority of commercial aviation aircraft offers the pilot direct, vocalized instructions to avoid danger, known as a resolution advisory. TCAS II systems coordinate their resolution advisories before issuing commands to the pilots, so that if one aircraft is instructed to descend, the other will typically be told to climb—maximizing the separation between the two aircraft.

However, the ability of the host aircraft to perform an avoidance maneuver is limited by the designed aircraft flight envelope. This is especially true for avoidance maneuvers undertaken in the Collision Avoidance phase of an encounter. Further, an avoidance maneuver utilizing excessive vertical or horizontal velocities may increase the risk for induced collisions with aircraft flying at neighboring flight levels—above or below. Therefore a reduction of the recognition time for the aircraft pilots flying at neighboring flight levels may be the result. However, aborting or reverting an avoidance maneuver utilizing excessive vertical or horizontal velocities requires more time, thereby making it more difficult to prevent an induced collision.

Hence, there is a need to provide an improved method for an aircraft for handling potential collisions in air traffic, which is in particular improved in view of preventing impact of detect and avoid induced collision conflicts, especially in RVSM (Reduced Vertical Separation Minimum) airspace.

SUMMARY

It should be noted that the aspects of the disclosure described herein in the following apply both to the method for an aircraft for handling potential collisions in air traffic, to the device for an aircraft for handling potential collisions in air traffic and to the aircraft comprising such device.

According to the present disclosure a method for an aircraft for handling potential collisions in air traffic is presented. The method comprises providing, by a collision avoidance system, a collision avoidance maneuver to avoid a collision with one or more intruders. The collision avoidance system is configured to obtain information about these intruders. The method comprises further providing flight management constraints from an onboard flight system. Further, the method comprises providing flight situation data from a navigation system. The method comprises generating a modified collision avoidance maneuver based on the collision avoidance maneuver provided by the collision avoidance system, the flight situation data and the flight management constraints.

In this context the term "obtain" may refer to receiving and detecting. For example the collision avoidance system may actively detect information about of one or more intruders, i.e. it obtains information from these intruders in an active way. Alternatively, the collision avoidance system may receive the information about one or more intruders in a passive way, i.e. obtains information in a passive way. However, the collision avoidance system has to be in a receiving mode to obtain the information of these intruders.

Information about the intruders may comprise the position, their speed, a current flying direction, any kind of configuration information of the intruders or any other kind of useful information of the intruders. The collision avoidance maneuver provided by the collision avoidance system may for example comprise a resolution advisory.

The term "intruder" may be understood as object, unmanned or manned aircraft, drone, obstacle or the like.

Under certain circumstances the authority of the collision avoidance system to perform an avoidance maneuver may be reduced. Exemplarily these circumstances may be: operation with command and control link available; operation under command and control link loss; operation in RVSM (Reduced Vertical Separation Minimum) air space; operation in degraded mode (degradation of the host aircraft, detect and avoid degradation including sensor degradation), and further not mentioned conditions.

As a result, an improved method for an aircraft for handling potential collisions in air traffic is provided, which is in particular improved in view of avoiding collisions in crowded airspace.

This is achieved as the collision avoidance system provided by the collision avoidance system is modified in view of the flight situation data and flight management constraints.

According to a further embodiment of the method flight management constraints may comprise at least one of at least a limitation of the climb or descend rate, a limitation of the turn rate, a constraint of the avoidance maneuver in vertical dimension and a constraint of the avoidance maneuver in horizontal dimension. The authority of the collision avoidance system (detect and avoid system) to perform an avoidance maneuver may be constrained. For example the climb/descend rate may be limited. For example if the collision avoidance system is providing a certain descend rate the provided descend rate may be limited to a certain rate. Further, for example the turn rate may be limited. If, for example the collision avoidance system is providing a certain turn rate, the provided descend rate may be limited to a certain rate. Further, for example the avoidance maneuver provided by the collision avoidance system may be constrained in vertical dimension (fencing). Further, for example the avoidance maneuver provided by the collision avoidance system may be constrained in horizontal dimension (fencing). Furthermore, the avoidance maneuver provided by the collision avoidance system may be constrained by any kind of combinations of the above.

The onboard flight system providing the flight management constraints may for example be a flight management system or any appropriate onboard system.

With for example a limitation of the climb or descend rate, a limitation of the turn rate, a constraint of the avoidance maneuver in vertical dimension and a constraint of the avoidance maneuver in horizontal dimension or any kind of combination of the aforementioned, the collision avoidance maneuver provided by the collision avoidance system is modified, in order to reduce risks caused by the detect and avoid systems induced collision conflicts.

The induced collision conflicts may be generated by false avoid maneuvers, which are known to occur relatively often in practical flight operation. Reasons for these false avoid maneuvers may be failures of the typically sense and avoid equipment, unexpected changes of the intruder flight path (e.g. future leveling off after a climb), or not fully certified hardware, software or algorithms of the sense and avoid system (e.g. the TCAS is not allowed to be followed without pilot monitoring).

Hence a high-integrity avoid modification system has to be introduced especially when there is no pilot monitoring the avoid maneuver. The method described herein may be applied redundantly. The redundant application of the method may be applied with a very high DAL (Design authority level) system.

The reduction is achieved for example by avoidance of a penetration of neighboring flight levels and/or horizontal corridors, or an increase in time for penetration of neighboring flight levels, thereby increasing for example transparency and/or predictability of host aircraft operations for other airspace users and aircraft. Further, the time to abort or revert an induced collision can for example be reduced. Furthermore, the reaction time for pilots operating an aircraft on neighboring flight levels and/or horizontal corridors can for example be increased. Further, the vertical or horizontal corridors are not left. Therefore, the flight path stays smooth and predictable, wherein e.g. under TCAS failure conditions very abrupt and excessive maneuvers may occur.

According to a further embodiment of the method the flight management constraints may further comprise flight track data. For example, the flight management constraints may further be based on flight track data, e.g. a flight plan for the aircraft.

The flight situation data may comprise the current position of the aircraft (host aircraft), the current altitude and current velocity vector amongst others. The data may for example be provided by an onboard navigation system of the host aircraft. This may have the advantage that the generated modified avoid maneuver may be generated under known current conditions of the aircraft.

According to a further embodiment of the method the collision avoidance systems may comprise at least one of at least a cooperative collision avoidance system and a non-cooperative collision avoidance system. The term cooperative collision avoidance system may be understood as cooperative surveillance system or the like. The term non-cooperative collision avoidance system may be understood as non-cooperative surveillance system.

A cooperative collision avoidance system (hereinafter abbreviated as CCAS for easy reference though this is not a generally recognized term in the relevant technical field) designates any collision avoid system, which (like TCAS II) is for example equipped with a cooperative sensor suitable to obtain, for example to detect or to receive a position of a cooperative intruder and to provide a resolution advisory to avoid a collision with the cooperative intruder. Such cooperative collision avoidance systems CCAS will for example issue resolution advisories after having automatically negotiated a mutual avoidance maneuver with the cooperative intruder. The second generation of the TCAS system (the so-called TCAS II system), which is used in the majority of commercial aviation aircraft offers the pilot direct, vocalized instructions to avoid danger, known as a resolution advisory. TCAS II systems coordinate their resolution advisories before issuing commands to the pilots, so that if one aircraft is instructed to descend, the other will typically be told to climb—maximizing the separation between the two aircraft.

Cooperative intruder means an intruder able to cooperate with the cooperative sensor of the own aircraft. They are for example equipped with a transponder, in particular with a Mode S or a Mode C transponder, TCAS (TCAS II or earlier generation), ADS-B.

On the other hand, non-cooperative intruder mean intruders that do not cooperate with a cooperative sensor of the own aircraft (e.g. having no—or only inactivated—transponder, TCAS, ADS-B, etc.). A non-cooperative collision avoidance system may comprise a non-cooperative sensors which may be autonomous in terms of data acquisition and may not rely on a cooperation with dedicated other sensors or services.

According to a further embodiment of the method the collision avoidance system may comprise at least one sensor. The at least one sensor may be an active sensor, a passive sensor, an active or passive radio detection and ranging (RADAR) sensor, a weather radar sensor, an electro-optical sensor, a laser range finder, a laser detection and ranging (LADAR) sensor, an acoustic sensor, an infrared sensor, based on a transponder or on ADS-B (Automatic dependent surveillance—broadcast). According to a further embodiment the sensor may be a combination of two or more of the aforementioned sensors.

According to a further embodiment of the method the aircraft may either be a piloted aircraft or a remotely piloted aircraft. The method according to the disclosure herein can be used both for piloted aircraft and unmanned aircraft, in particular for so-called RPAS (Remotely Piloted Air Systems) that are connected to a ground control station via a data link.

The aircraft may comprise one of the devices for handling potential collisions in air as explained above and may comprise an output unit configured to output one of the options provided by the device for handling potential collisions. In an example, the output unit is a display unit. In an example, the aircraft further comprises a drive unit, e.g. a flight control computer or an auto-pilot, configured to execute one of the options provided by the device for handling potential collisions.

The aircraft may also be equipped with a combined Mode-S/IFF transponder. The Mode-S component may report, among other parameters, baro-altitude and transponder squawk code of the aircraft. In addition, the own aircraft Mode-S transponder may be detected by intruder CCAS systems and may enable their collision avoidance responsibility. The IFF transponder function may be used for mission purposes only.

According to a further embodiment of the method the collision avoidance maneuver, e.g. a resolution advisory, from the collision avoidance system and the generated collision avoidance maneuver may be brought to the attention of a human controller who might or can manually override the execution of the generated collision avoid maneuver in order to follow the resolution advisory.

According to a further embodiment of the method a warning may be brought to the attention of the human controller if the generated modified collision avoid maneuver differs from the provided resolution advisory. This may have the advantage that the human controller may be aware of any deviation from the provided well-established resolution advisory.

As it becomes clear from the foregoing description a suggestion within the meaning of this disclosure herein is a complete set of commands that can be executed automatically by the flight control computer or an autopilot of the aircraft if not overruled by the pilot or the remote controller in the ground station. In case of loss of link between the ground station and the (unmanned) aircraft such suggestions are automatically executed by the aircraft without human intervention.

According to the present disclosure a device for an aircraft for handling potential collisions in air traffic is presented. The device comprises a collision avoidance system comprising at least one sensor to detect a position of one or more intruders and configured to provide a collision avoidance maneuver to avoid a collision with these intruders. Further, the device comprises an onboard flight system configured to provide flight management constraints. The device further comprises a navigation system configured to provide flight situation data. Further, the device comprises an avoid modification processing unit comprising at least one receiver, configured to receive at least one of at least the collision avoidance maneuver, flight situation data and flight management constraints. Further, the avoid modification processing unit is configured to generate a modified collision avoidance maneuver based on at least one of at least the collision avoidance maneuver, the flight situation data and flight management constraints. The device further comprises an auto pilot or flight control computer for executing the modified collision avoid maneuver provided by the avoid modification processing unit.

According to a further embodiment of the device, the device comprises at least two redundant avoid modification processing units. Exemplarily the avoid modification processing unit comprises a high integrity. Preferably the avoid modification processing unit is designed according to DAL provisions.

The onboard flight system providing the flight management constraints may for example be a flight management system (FMS) or any appropriate onboard, preferably computerized system.

According to a further embodiment of the device, the collision avoidance system can further comprise additional sensors, like FLARM or ADS-B, and is configured for and includes means or structure for feeding the data acquired by these sensors into the avoid processing unit.

According to a further embodiment of the device, the device may further comprise a warning function in order to bring the collision avoidance maneuver (e.g. a resolution advisory) from the collision avoidance system and the generated modified collision avoidance maneuver to the attention of a human controller who might or can manually override the execution of the generated modified collision avoid maneuver in order to follow the resolution advisory.

According to a further embodiment of the device, the warning function may further bring a warning to the attention of the human controller if the generated modified collision avoid maneuver differs from the provided resolution advisory.

According to the present disclosure an aircraft for handling potential collisions in air traffic is presented. The aircraft may comprise an aforementioned device.

According to a further embodiment the aircraft comprises at least two redundant aforementioned devices.

The aircraft may by a plane, a helicopter, a drone or the like.

As a result, an improved method and device for or handling potential collisions in air traffic is provided which is in particular improved in view of crowded airspace. This is achieved as the collision avoidance maneuver provided by the collision avoidance system is modified by certain constraints in order to generate a modified collision avoidance maneuver.

Therefore, the risk caused by detect and avoid systems induced collision conflicts is reduced, through avoidance of penetration of neighboring flight levels and/or horizontal corridors, increase of time to penetration of neighboring flight levels and/or horizontal corridors, thereby increasing transparency and/or predictability of host aircraft operations for other airspace users and aircraft. The time to abort or revert an induced collision is reduced and the time to react is increased for pilots operating aircraft on neighboring flight levels and/or horizontal corridors.

It shall be understood that the methods for an aircraft for handling potential collisions in air traffic, the devices for an aircraft for handling potential collisions in air traffic and the aircraft comprising such device according to the independent claims have similar and/or identical preferred embodiments, in particular, as defined in the dependent claims. It shall be understood further that a preferred embodiment of the disclosure herein can also be any combination of the dependent claims with the respective independent claim.

These and other aspects of the present disclosure will become apparent from and be elucidated with reference to the embodiments described hereinafter.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure herein. In the drawings, the left-most digit(s) of a reference number can identify the drawing in which the reference number first appears. The same numbers can be used throughout the drawings to reference like features and components. In the following description, various embodiments of the disclosure herein are described with reference to the following drawings, in which.

DETAILED DESCRIPTION

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Figure 1:
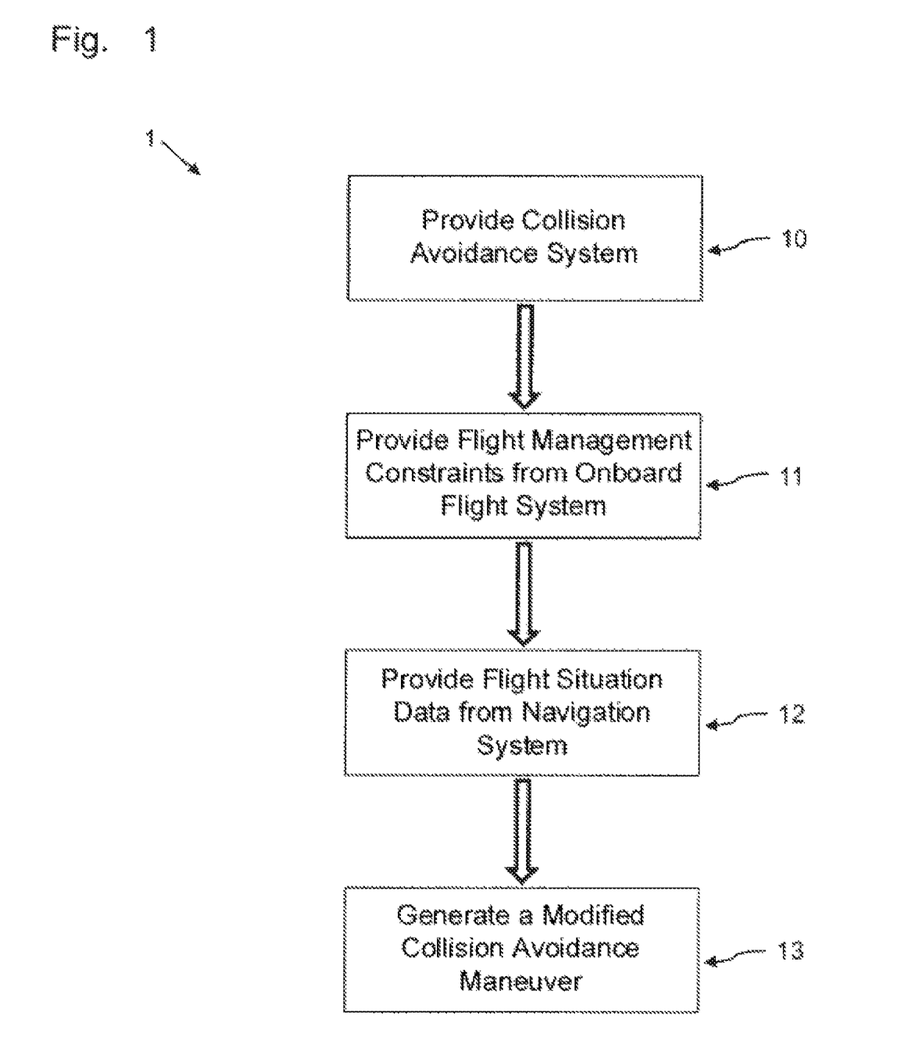
FIG. 1 shows schematically a flowchart of an embodiment of the method.

Figure (or "FIG.") 1 shows schematically and exemplarily an embodiment of a flowchart representation generally designated 1 of the method for handling potential collisions in air traffic.

In this example the method comprises the step 10 of providing by a collision avoidance system, configured to obtain information about one or more intruders, a collision avoidance maneuver to avoid a collision with these intruders. Further, the method comprises the step 11 of providing flight management constraints from an onboard flight system. In step 12, the method further comprises providing flight situation data from a navigation system. Further, the method comprises the step 13 of generating a modified collision avoidance maneuver based on the resolution collision avoidance maneuver provided by the collision avoidance system, the flight situation data and the flight management constraints.

Figure 2:
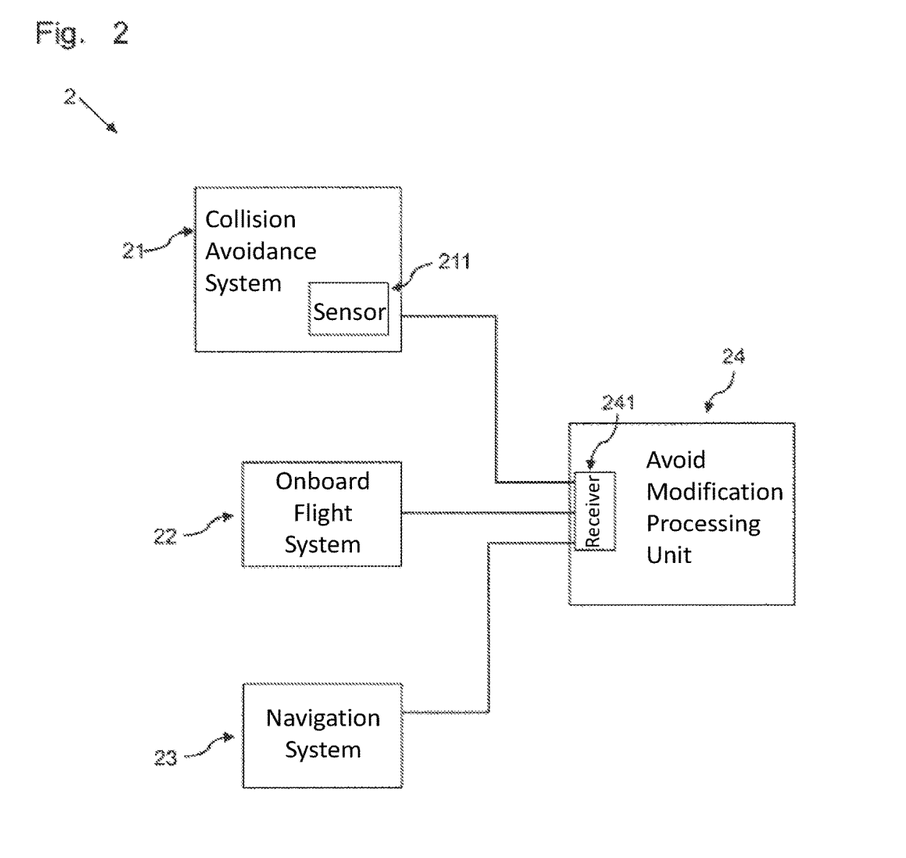
FIG. 2 shows schematically an embodiment of a device for handling potential collisions in air traffic.

FIG. 2 shows schematically and exemplarily an embodiment of a device generally designated 2 for handling potential collisions in air traffic.

The device 2 comprises a collision avoidance system 21. The collision avoidance system 21 comprises at least one sensor 211 to detect a position of one or more intruders. The collision avoidance system 21 is configured to provide a collision avoidance maneuver to avoid a collision with these intruders. The device 2 further comprises an onboard flight system 22, for example a flight management system (FMS). The onboard flight system 22 is configured to provide flight management constraints. Further, the device 2 comprises a navigation system 23. The navigation system 23 is configured to provide flight situation data. The device 2 further comprises an avoid modification processing unit 24. The avoid modification processing unit 24 comprises at least one receiver 241. The receiver 241 is configured to receive at least one of at least the collision avoidance maneuver, flight situation data and flight management constraints. The avoid modification processing unit 24 is further configured to generate a modified collision avoidance maneuver based on at least one of at least the resolution advisory, the flight situation data and flight management constraints.

The collision avoidance system 21 may comprise in a further embodiment an avoid algorithm to compute an avoid trajectory.

Figure 3:
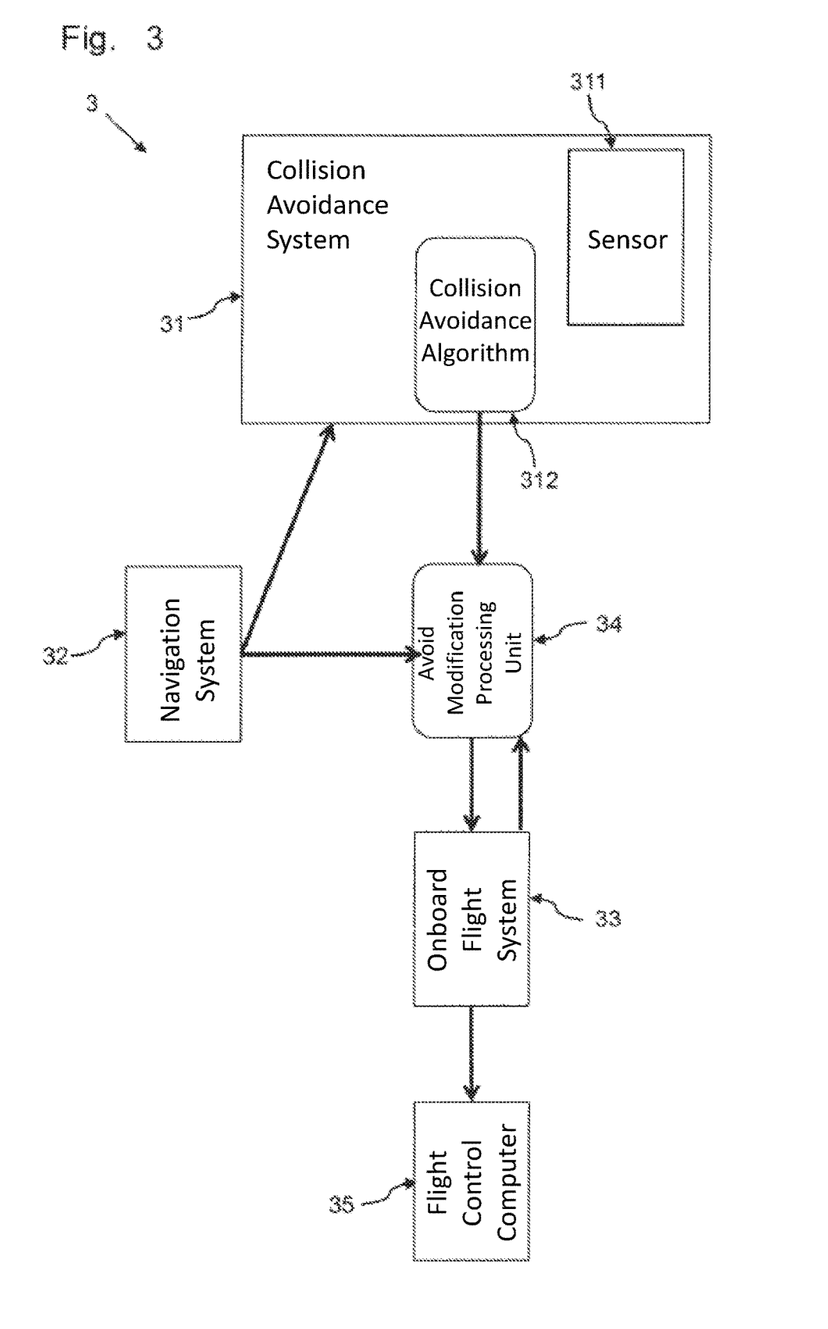
FIG. 3 shows schematically a further embodiment of a device for handling potential collisions in air traffic.

FIG. 3 shows schematically and exemplarily a further embodiment of a device generally designated 3 for handling potential collisions in air traffic.

The device 3 comprises a collision avoidance system 31. The collision avoidance system 31 comprises at least one sensor 311 to detect a position of one or more intruders. Further, the collision avoidance system 31 comprises a processing unit 312 configured to generate a collision avoidance maneuver according to a collision avoidance algorithm 312. Further, the device 3 comprises a navigation system 32. The navigation system 33 is configured to provide flight situation data. The collision avoidance system 31 receives navigation related information of the aircraft, e.g. the current position, current altitude, the current velocity vector from a navigation system 32. The device 3 further comprises an onboard flight system 33, for example a flight management system (FMS). The onboard flight system 33 is configured to provide flight management constraints (e.g. nominal route, permissible vertical separation/horizontal separation, permissible climb, dive/turn rates). The device 3 further comprises an avoid modification processing unit 34. The avoid modification processing unit 34, or at least a receiver of the avoid processing unit (not shown), is configured to receive at least one of at least the collision avoidance maneuver, flight situation data and flight management constraints. The avoid modification processing unit 34 is further configured to generate a modified collision avoidance maneuver based on at least one of at least the resolution advisory, the flight situation data and flight management constraints. The avoid modification processing unit 34 is providing the modified collision avoidance maneuver to the onboard flight system 33. Further, the device 3 comprises an auto pilot or flight control computer 35 for executing the auto pilot commands based on the modified collision avoid maneuver provided by the onboard flight system 33.

According to a further embodiment (not shown) the avoid modification processing unit 34 may provide the modified collision avoidance maneuver directly to the auto pilot or flight control computer 35.

Figure 4:
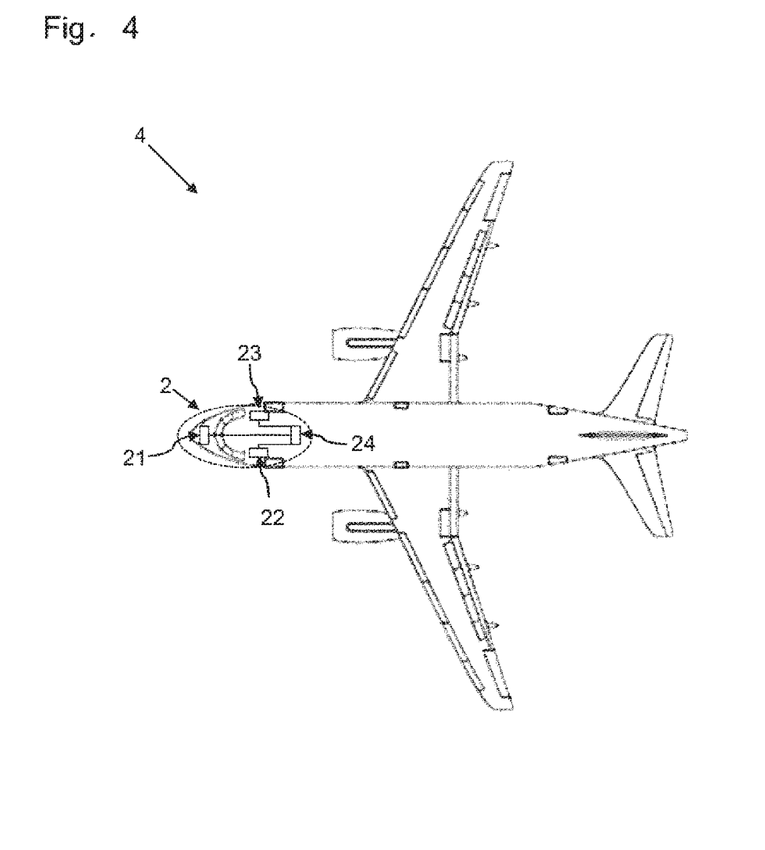
FIG. 4 shows schematically an embodiment of an aircraft comprising a device for handling potential collisions in air traffic.

FIG. 4 shows schematically and exemplarily an embodiment of an aircraft generally designated 4 comprising a device 2 for handling potential collisions in air traffic.

The device 2 for handling potential collisions in air traffic comprises a collision avoidance system 21, for example a cooperative collision avoidance system, with e.g. a transponder based cooperative sensor. The device 2 further comprises an onboard flight system 22, for example a flight management system. The device 2 further comprises a navigation system 23 and an avoid modification processing unit 24. The device may further comprise (not shown) a flight control computer or an auto-pilot to execute the modified collision avoid maneuver provided by the device 2 for handling potential collisions.

In this example the aircraft 4 is a piloted aircraft. However the method according to the disclosure herein can also be applied for unmanned aircraft that are connected via a data link to a ground station.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

It has to be noted that embodiments of the disclosure herein are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure herein has been illustrated and described in detail in the drawings and foregoing description, such illustration and description are to be considered illustrative or exemplary and not restrictive. The disclosure herein is not limited to the disclosed embodiments. Other variations to the disclosed embodiments can be understood and effected by those skilled in the art in practicing a claimed disclosure herein, from a study of the drawings, the disclosure, and the dependent claims.

What is claimed is:

1. A method for an aircraft for handling potential collisions in air traffic, comprising:
    obtaining, using a collision avoidance system, information about one or more intruders;
    providing, by the collision avoidance system, a collision avoidance maneuver to avoid a collision with the one or more intruders;
    providing flight management constraints from an onboard flight system;
    providing flight situation data from a navigation system;
    generating a modified collision avoidance maneuver based on the collision avoidance maneuver provided by the collision avoidance system, the flight situation data, and the flight management constraints; and
    alerting a human controller of a resolution advisory provided from the collision avoidance system and the modified collision avoidance maneuver,
    wherein the flight management constraints comprise a constraint of the collision avoidance maneuver in a vertical dimension and/or a constraint of the collision avoidance maneuver in a horizontal dimension, based on which the aircraft does not leave vertical and/or horizontal corridors, and
    wherein execution of the modified collision avoidance maneuver is overrideable by the human controller.

2. The method according to claim 1, wherein the flight management constraints comprise at least one of a limitation of the climb or descend rate and a limitation of the turn rate.

3. The method according to claim 2, wherein the flight management constraints further comprise flight track data.

4. The method according to claim 1, wherein the collision avoidance system comprises at least one of a cooperative collision avoidance system and a non-cooperative collision avoidance system.

5. The method according to claim 1, wherein the collision avoidance system comprises at least one sensor, wherein the at least one sensor comprises an active sensor, a passive sensor, an active or passive radio detection and ranging sensor, a weather radar sensor, an electro-optical sensor, a laser range finder, a laser detection and ranging sensor, an acoustic sensor, an infrared sensor, based on a transponder or on Automatic Dependent Surveillance-Broadcast (ADS-B), or any combinations thereof.

6. The method according to claim 1, wherein the aircraft is either a piloted aircraft or a remotely piloted aircraft.

7. The method according to claim 1, wherein a warning is brought to the attention of the human controller when the modified collision avoidance maneuver differs from the provided resolution advisory.

8. A device for an aircraft for handling potential collisions in air traffic, the device comprising:
    a collision avoidance system comprising at least one sensor configured to detect a position of one or more intruders, wherein the collision avoidance system is configured to provide a collision avoidance maneuver to avoid a collision with the one or more intruders;
    an onboard flight system configured to provide flight management constraints;
    a navigation system configured to provide flight situation data;
    an avoid modification processing unit comprising at least one receiver configured to receive at least one of the collision avoidance maneuver, the flight situation data, and the flight management constraints,
    wherein the avoid modification processing unit is configured to generate a modified collision avoidance maneuver based on at least one of the collision avoidance maneuver, the flight situation data, and flight management constraints;
    an auto pilot or flight control computer for executing the modified collision avoidance maneuver provided by the avoid processing unit; and
    a warning function configured to bring the collision avoidance maneuver from the collision avoidance system and the modified collision avoidance maneuver to attention of a human controller, who can manually override execution of the modified collision avoidance maneuver to follow the collision avoidance maneuver,
    wherein the flight management constraints comprise a constraint of the collision avoidance maneuver in a vertical dimension and/or a constraint of the collision avoidance maneuver in a horizontal dimension, based on which the aircraft does not leave vertical and/or horizontal corridors.

9. The device according to claim 8, comprising at least two redundant avoid modification processing units.

10. The device according to claim 8, wherein the collision avoidance system further comprises additional sensors and is configured for feeding data acquired by the additional sensors into the avoid processing unit.

11. The device according to claim 8, wherein the warning function further brings a warning to the attention of the human controller when the modified collision avoidance maneuver differs from a provided resolution advisory.

12. An aircraft comprising a device for an aircraft for handling potential collisions in air traffic, the device comprising:
    a collision avoidance system comprising at least one sensor to detect a position of one or more intruders, the collision avoidance system being configured to provide a collision avoidance maneuver to avoid a collision with the one or more intruders;
    an onboard flight system configured to provide flight management constraints;
    a navigation system configured to provide flight situation data;
    an avoid modification processing unit comprising at least one receiver configured to receive at least one of the collision avoidance maneuver, the flight situation data, and the flight management constraints, wherein the avoid modification processing unit is configured to generate a modified collision avoidance maneuver based on at least one of the collision avoidance maneuver, the flight situation data, and the flight management constraints;

an auto pilot or flight control computer for executing the modified collision avoidance maneuver provided by the avoid processing unit; and a warning function configured to bring the collision avoidance maneuver from the collision avoidance system and the modified collision avoidance maneuver to attention of a human controller, who can manually override execution of the modified collision avoidance maneuver to follow the collision avoidance maneuver, wherein the flight management constraints comprise a constraint of the collision avoidance maneuver in a vertical dimension and/or a constraint of the collision avoidance maneuver in a horizontal dimension, based on which the aircraft does not leave vertical and/or horizontal corridors.

13. The aircraft according to claim 12, wherein the warning function further brings a warning to the attention of the human controller when the modified collision avoidance maneuver differs from a provided resolution advisory.

14. An aircraft comprising at least two redundant devices for an aircraft for handling potential collisions in air traffic, the at least two redundant devices each comprising:

a collision avoidance system comprising at least one sensor to detect a position of one or more intruders, the collision avoidance system being configured to provide a collision avoidance maneuver to avoid a collision with the one or more intruders;

an onboard flight system configured to provide flight management constraints;

a navigation system configured to provide flight situation data;

an avoid modification processing unit comprising at least one receiver configured to receive at least one of the collision avoidance maneuver, the flight situation data, and the flight management constraints, wherein the avoid modification processing unit is configured to generate a modified collision avoidance maneuver based on at least one of the collision avoidance maneuver, the flight situation data, and the flight management constraints;

an auto pilot or flight control computer for executing the modified collision avoidance maneuver provided by the avoid processing unit; and a warning function configured to bring the collision avoidance maneuver from the collision avoidance system and the modified collision avoidance maneuver to attention of a human controller, who can manually override execution of the modified collision avoidance maneuver to follow the collision avoidance maneuver, wherein the flight management constraints comprise a constraint of the collision avoidance maneuver in a vertical dimension and/or a constraint of the collision avoidance maneuver in a horizontal dimension, based on which the aircraft does not leave vertical and/or horizontal corridors.

15. The aircraft according to claim 14, wherein the warning function further brings a warning to the attention of the human controller when the modified collision avoidance maneuver differs from a provided resolution advisory.

* * * * *